United States Patent [19]

Suzuki

[11] Patent Number: 4,809,827

[45] Date of Patent: Mar. 7, 1989

[54] BRAKE DISC WITH A PAIR OF SLIDE PLATES JOINED TO A SUPPORT JAW AND CYLINDRICAL PORTION BY RADIALLY EXTENDING RIBS

[75] Inventor: Tsuguya Suzuki, Wako, Japan

[73] Assignee: Honda Giken Kogyo Kabushiki Kaisha, Tokyo, Japan

[21] Appl. No.: 129,624

[22] Filed: Dec. 7, 1987

[30] Foreign Application Priority Data

Dec. 8, 1986 [JP] Japan .................. 61-188903

[51] Int. Cl.$^4$ ...................... F16D 65/10; F16D 65/78
[52] U.S. Cl. ...................... 188/218 XL; 188/264 AA
[58] Field of Search ......... 188/264 AA, 264 A, 18 A, 188/710 G, 218 XL, 264 R; 301/6 CS, 6 E, 6 WB; 192/70.12, 113 A; 295/33; 105/59; 29/DIG. 5, 156.8 B, 274; 164/9–11, 15, 91, 94, 99

[56] References Cited

U.S. PATENT DOCUMENTS 4,002,227  1/1977  Simon .................. 188/218 XL

FOREIGN PATENT DOCUMENTS 0487753  11/1952  Canada ................ 188/264 A
80535   5/1984  Japan .
122922   8/1986  Japan .
2181802   4/1987  United Kingdom ...... 188/264 AA Primary Examiner—Andres Kashnikow
Assistant Examiner—Robert J. Oberleitner
Attorney, Agent, or Firm—Armstrong, Nikaido, Marmelstein & Kubovcik

[57] ABSTRACT

A brake disc having a support jaw projecting radially from a cylindrical portion and slide plates attached to the support jaw by integrally formed, radially extending ribs. The wall thickness of the support jaw is less than the wall thickness of the cylindrical portion and the radially inner ends of the ribs are formed integral with the cylindrical portion of the brake disc.

5 Claims, 1 Drawing Sheet

4,809,827

BRAKE DISC WITH A PAIR OF SLIDE PLATES JOINED TO A SUPPORT JAW AND CYLINDRICAL PORTION BY RADIALLY EXTENDING RIBS

BACKGROUND OF THE INVENTION

The present invention relates to a brake disc comprising a support jaw integrally provided to project radially outwardly from one end of a cylindrical portion of the disc, and a pair of annular, ring-like slide plates secured on opposite sides of the support jaw by a plurality of radially extending ribs interposed therebetween.

A conventional brake disc having similar components is known, for example, from Japanese Patent Application Laid-open No. 80535/84.

However, in the conventional brake disc, the annular slide plates disposed respectively on the opposite sides of the support jaw have the same wall thickness as the support jaw. This increases the distance between the outer surfaces of the slide plates and may require an increase in the distance between two arms of a brake caliper which straddles the brake disc, thereby reducing the rigidity of the caliper.

The present invention has been accomplished with such circumstances in view, and it is an object of the present invention to provide a brake disc wherein the distance between the outer surfaces of the annular slide plates can be reduced.

SUMMARY OF THE INVENTION

According to the present invention, the support jaw is formed with a wall thickness less than the wall thickness of the cylindrical portion of the brake disc, and each of the ribs is connected at its radially inner end to the cylindrical portion With the construction of the present invention, the distance between the outer surfaces of the slide plates is reduced by decreasing the wall thickness of the support jaw and moreover, a reduction in rigidity of the brake disc due to the decrease in wall thickness is avoided by connecting or joining the inner end of each of the ribs to the cylindrical portion of the brake disc.

The invention and the advantages provided thereby will be more fully understood with reference to the following detailed description of the preferred embodiment taken in conjunction with the accompanying drawings.

DESCRIPTION OF THE PREFERRED EMBODIMENTS

Figure 1:
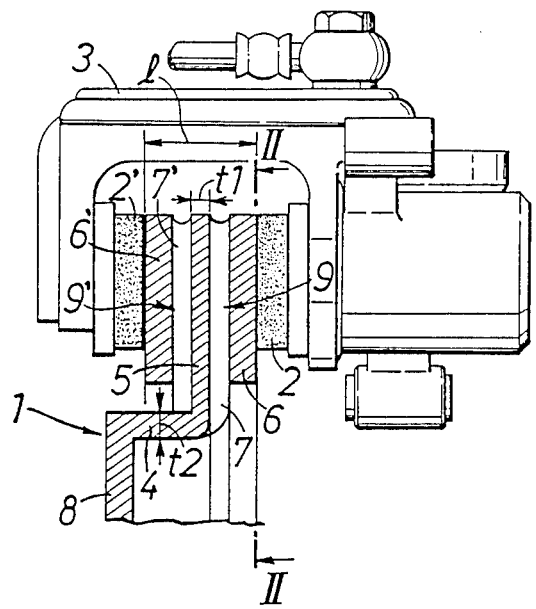
FIG. 1 is a side elevation, partly in section showing the brake disc and a brake caliper.

The present invention will now be described by way of one embodiment with reference to the accompanying drawings wherein like reference numerals refer to the same parts throughout.

With reference to FIG. 1, there is shown a disc brake assembly including a dual ventilated brake disc 1, a pair of friction pads 2 and 2' disposed in opposed relation to opposite side surfaces of the brake disc 1, and a brake caliper 3 disposed astride the friction pads 2 and 2'. A hydraulic piston (not shown) is mounted on the brake caliper 3 for urging the one friction pad 2 toward the disc 1. When the hydraulic piston is operated to urge the one friction pad 2 against one side surface of the brake disc 1, the resulting reaction force causes the brake caliper 3 to move in a direction opposite to the direction of movement of the piston, thereby causing the other friction pad 2' to bear against the other side surface of the brake disc 1. In this manner, a friction force is equally applied to the opposite side surfaces of the brake disc 1, whereby braking is applied to a rotor, e.g. a wheel having the brake disc secured thereon.

Figure 2:
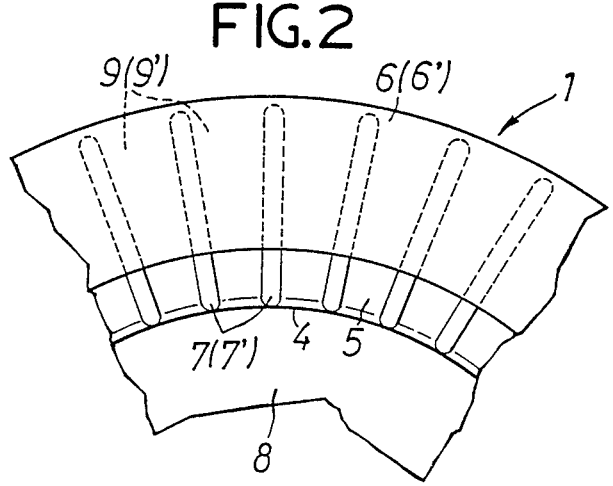
FIG. 2 is a view taken along line II—II of FIG. 1.

The structure of the brake disc will be described in conjunction with FIG. 2. The brake disc 1 comprises a support jaw 5 integrally provided on a cylindrical portion 4 of the brake disc which is concentrically secured to a rotor such as a wheel. The support jaw 5 projects radially outwardly from one end of the cylindrical portion 4, and annular, ring-like slide plates 6 and 6' are concentrically disposed on opposite sides of the support jaw 5 with a plurality of radially extending ribs 7 and 7' interposed therebetween. The friction pads 2 and 2' are brought into sliding contact with the corresponding outer surfaces of the slide plates 6 and 6', respectively.

A radially inwardly overhanging mounting portion or jaw 8 which is secured to the rotor is integrally provided at the other end of the cylindrical portion 4. Each of the slide plates 6 and 6' has an outside diameter set to correspond to the outside diameter of the support jaw 5 and an inside diameter larger value than the outside diameter of the cylindrical portion 4. Further, the circumferentially spaced ribs 7 and 7' form a plurality of peripheral air passages 9, 9' between the support jaw 5 and each of the slide plates 6 and 6', so that air flowing through the air passages 9 and 9' during rotation of the brake disc 1 prevents overheating of the slide plates 6 and 6' due to the friction between the latter and the friction pads 2 and 2'.

According to the present invention the support jaw 5 has a wall thickness t1 set at a smaller value than a wall thickness t2 of the cylindrical portion 4 (t1 < t2). For example, t1 is set at 4 mm, and t2 is set at 7 mm. Each of the ribs 7 and 7' is connected or joined at its radially inner end to the cylindrical portion 4. More specifically, the ribs 7 are connected in a curved smooth manner to one end of the cylindrical portion 4, and the other ribs 7' are squarely connected to the radially outer surface of the cylindrical portion 4.

The operation of the present invention will now be described. Setting the wall thickness t1 of the support jaw 5 at a relatively small value enables the distance between the outer surfaces of the slide plates 6 and 6' to be reduced or set at a relatively small value. This makes it possible to avoid a reduction in rigidity of the brake caliper 3 straddling the friction pads 2 and 2' and the slide plates 6 and 6' which would otherwise result from a larger distance.

Reducing the wall thickness t1 of the support jaw 5 causes a reduction in strength at the connection or juncture of the support jaw 5 with the cylindrical portion 4. However, according to the present invention, the radially inner end of each of the ribs 7 and 7' is integrally joined or connected to the cylindrical portion 4 and hence, such reduction in strength can be compensated for. Experiments have shown that with t1 set at 4 mm and t2 set at 7 mm, a breakdown has been produced at the juncture between the support jaw 5 and the cylindrical portion 4 when each of the ribs 7 and 7' have not been formed to lead to or join with the cylindrical portion 4. However, no breakdown has been produced at such a juncture when each of the ribs 7 and 7' has been integrally joined to the cylindrical portion 4.

Thus, according to the present invention as discussed above, the support jaw has a wall thickness thinner than the wall thickness of the cylindrical portion and therefore, the distance between the outer surfaces of the slide plates can be reduced and this makes it possible to avoid reduction in rigidity of the brake caliper. Moreover, since each of the ribs is connected at its inner end to the cylindrical portion of the brake disc, it is possible to compensate for a reduction in strength at the connection or juncture between the cylindrical portion and the support jaw due to the reduced wall thickness of the support jaw, thereby avoiding a reduction in strength of the brake disc.

What is claimed is:

1. A brake disc comprising a cylindrical portion, a support jaw projecting radially outward from one end of said cylindrical portion, a pair of annular slide plates with one annular slide plate on each side of said support jaw and a plurality of radially extending ribs between each of said annular slide plates and said support jaw, said cylindrical portion, support jaw, annular slide plates and ribs being formed as an integral unit with the wall thickness of said support jaw being less than the wall thickness of said cylindrical portion and each of said ribs being integrally formed at a radially inner end as part of said cylindrical portion.

2. The brake disc defined by claim 1 wherein the radially inner end of each rib extends to a position radially inward relative to a radially inner periphery of the slide plate associated with said rib.

3. A brake disc comprising a cylindrical portion, a support jaw projecting radially outward from one end of said cylindrical portion, a pair of annular slide plates with one annular slide plate on each side of said support jaw and a plurality of radially extending ribs between each of said annular slide plates and said support jaw, said cylindrical portion, support jaw, annular slide plates and ribs being formed as an integral unit with the wall thickness of said support jaw being less than the wall thickness of said cylindrical portion and each of said ribs connected to a radially inner end to said cylindrical portion with the radially inner ends of said plurality of radially extending ribs between one of said annular slide plates and said support jaw integrally joined with a radially outer surface of said cylindrical portion and the radially inner ends of said plurality of radially extending ribs between the other of said annular slide plates and said support jaw integrally joined to said one end of said cylindrical portion.

4. A brake disc comprising a cylindrical portion, a support jaw projecting radially from the cylindrical portion, and slide plates attached to opposite sides of the support jaw by radially extending ribs, the support jaw having a wall thickness set less than a wall thickness of the cylindrical portion and each of said ribs being connected at a radially inner end thereof directly to the cylindrical portion whereby said ribs structurally reinforce said radially projecting support jaw.

5. The brake disc defined by claim 3 wherein said radially inner end of each rib extends radially inward from the radially inward peripheral portion of the slide plate attached by said rib.

* * * * *